United States Patent

Ro et al.

[11] Patent Number: 6,071,586
[45] Date of Patent: Jun. 6, 2000

[54] MANUFACTURING METHOD OF A MASTER DISK FOR FORMING AN OPTICAL DISK, AND THE MASTER DISK

[75] Inventors: Myong-do Ro, Kunpo; Du-seop Yoon, Suwon; Seung-tae Jung, Seongnam, all of Rep. of Korea

[73] Assignee: Samsung Electronics Co., Ltd., Suwon, Rep. of Korea

[21] Appl. No.: 09/037,851

[22] Filed: Mar. 10, 1998

[30] Foreign Application Priority Data

Sep. 12, 1997 [KR] Rep. of Korea .................. 97-47210

[51] Int. Cl.[7] .......................................... B32B 3/00
[52] U.S. Cl. ................... 428/64.1; 428/64.2; 428/64.4; 428/688; 428/702; 428/913; 430/270.11; 430/321; 430/495.1; 430/945; 369/275.4; 369/283
[58] Field of Search ................... 428/64.1, 64.2, 428/64.4, 688, 702, 913; 430/270.11, 321, 495.1, 945; 369/275.1, 275.4, 283, 288

[56] References Cited

U.S. PATENT DOCUMENTS

| | | | |
|---|---|---|---|
| 4,544,443 | 10/1985 | Ohta et al. | 156/643 |
| 4,586,173 | 4/1986 | Ando | 369/275.1 |
| 4,732,844 | 3/1988 | Ota | 430/322 |
| 4,861,699 | 8/1989 | Wijdenes | 430/321 |
| 5,383,176 | 1/1995 | Inui | 369/275.4 |
| 5,471,455 | 11/1995 | Jabr | 369/107 |
| 5,478,701 | 12/1995 | Jung | 430/321 |

FOREIGN PATENT DOCUMENTS

| | | |
|---|---|---|
| 2702077 | 9/1994 | France . |
| 1-237943 | 9/1989 | Japan . |
| 7-050038 | 2/1995 | Japan . |

OTHER PUBLICATIONS

Dutch Search Report for Ducth Patent Appication No. 1008602, dated Mar. 5, 1999.

*Primary Examiner*—Elizabeth Evans
*Attorney, Agent, or Firm*—Staas & Halsey

[57] ABSTRACT

A master disk used in the manufacturing of optical disks and having a substrate and a photoresist layer coated on the substrate. The method for manufacturing the master disk includes the steps of: coating a first photoresist layer on a substrate; exposing the first photoresist layer according to patterns of a groove formation recess and a land formation protrusion corresponding to a groove and a land, respectively; etching the exposed substrate and the first photoresist layer, to thereby form the groove formation recess and the land formation protrusion on the substrate; coating a second photoresist layer on the substrate, to thereby form the groove and the land at positions corresponding to the groove formation recess and the pit formation protrusion, respectively; exposing the second photoresist layer according to a pattern of a pit where predetermined information is recorded; and etching the second photoresist layer, to thereby form the pit on the groove and the land.

20 Claims, 6 Drawing Sheets

MANUFACTURING METHOD OF A MASTER DISK FOR FORMING AN OPTICAL DISK, AND THE MASTER DISK

BACKGROUND OF THE INVENTION

1. Field of the Invention

The present invention relates to a manufacturing method of a master disk used for manufacturing an optical disk which is an optical recording/reproducing medium, and to the master disk.

2. Description of the Related Art

Figure 1:
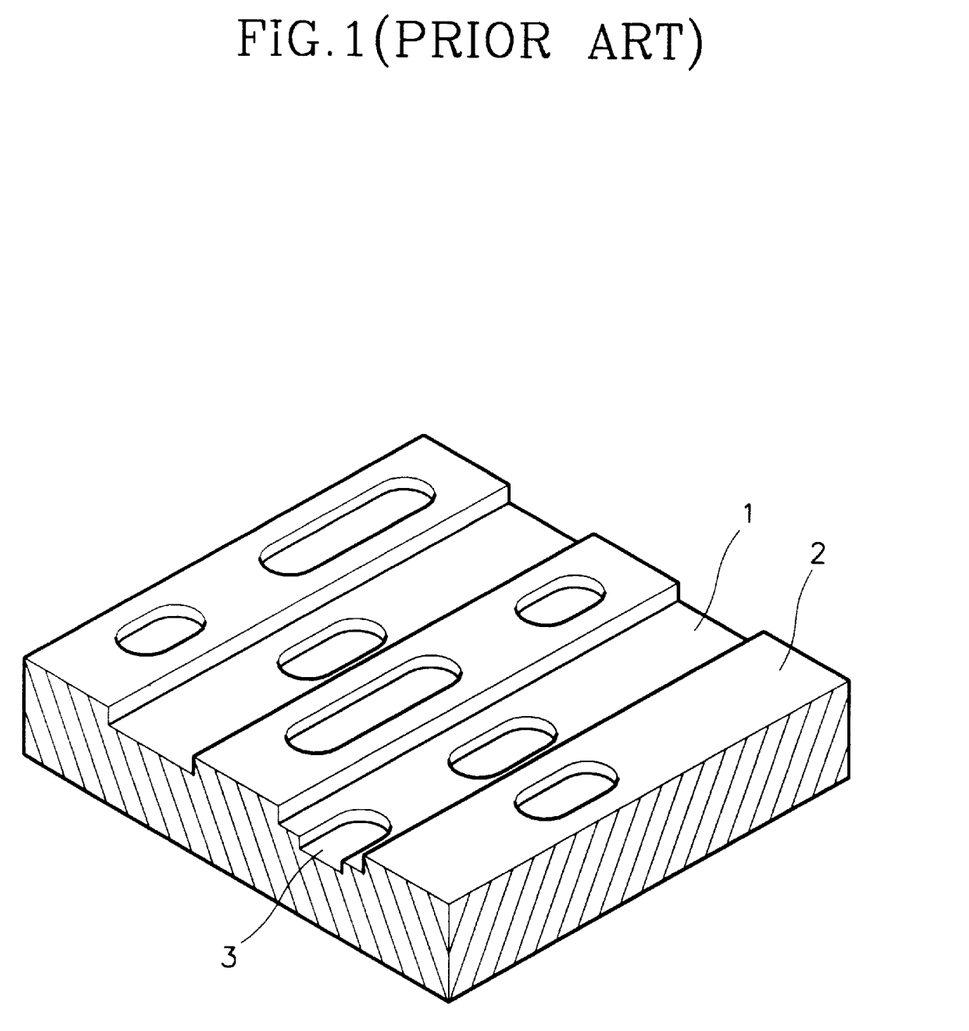
FIG. 1 is a perspective view partially showing a conventional optical disk.

In general, a high density optical disk such as a digital versatile disk (DVD)—random access memory (RAM) includes grooves 1 and lands 2 where information is recorded along spiral tracks, as shown in FIG. 1. Pits 3 are formed on the grooves 1 and the lands 2, respectively, to thereby record desired information thereon. Since both the grooves 1 and the lands 2 are used, a larger amount of information can be recorded with high density as compared to a conventional optical disk in which information is recorded either on the groove 1 or the land 2.

Figure 2A:
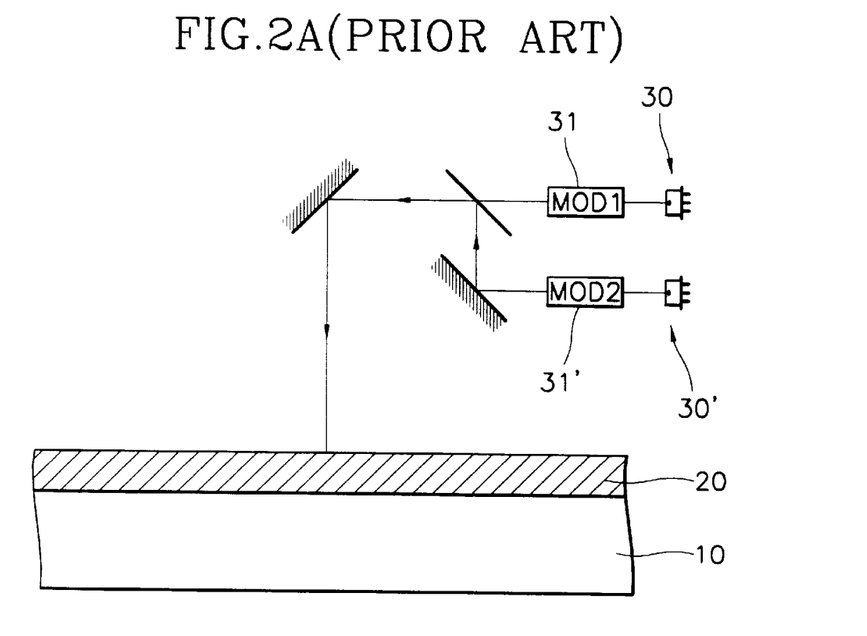
FIGS. 2A through 2D are views illustrating processes of manufacturing the conventional optical disk shown in FIG. 1.

The optical disk is manufactured through processes as shown in FIGS. 2A through 2D. As shown in FIG. 2A, a photoresist 20 is coated on a substrate 10, and then the photoresist 20 is exposed according to patterns of the groove 1, the land 2 and the pit 3 by simultaneously radiating a laser 30 for a groove and a laser 30' for a pit on a surface of the photoresist 20 while rotating the substrate 10. Reference numerals 31 and 31' indicate modulators for turning on/off the lasers 30 and 30', respectively.

Figure 2B:
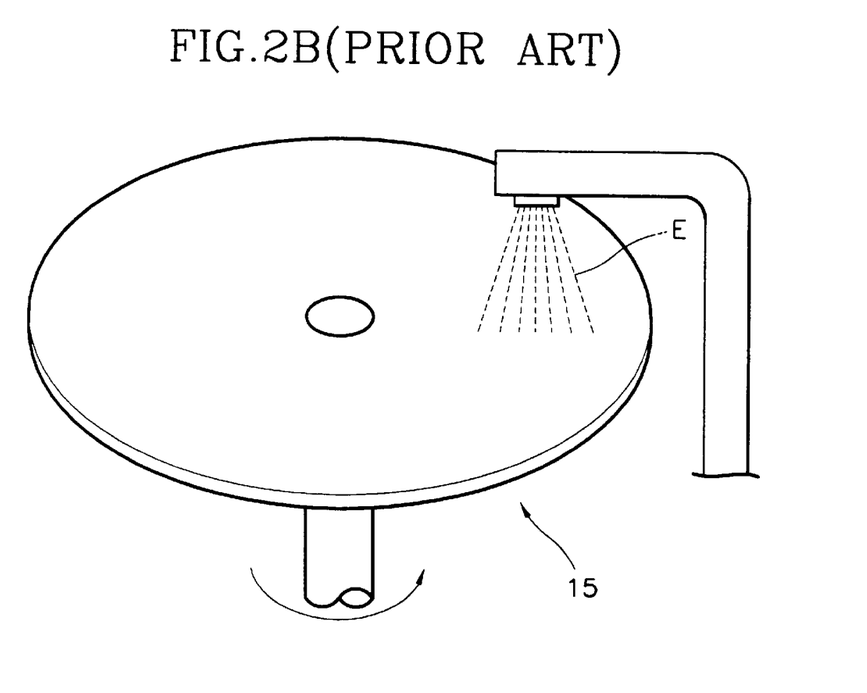

Subsequently, as shown in FIG. 2B, an etching reagent E is sprayed on the exposed substrate 10, to thereby manufacture a master disk 15 where grooves, lands and pits are formed.

Figure 2C:
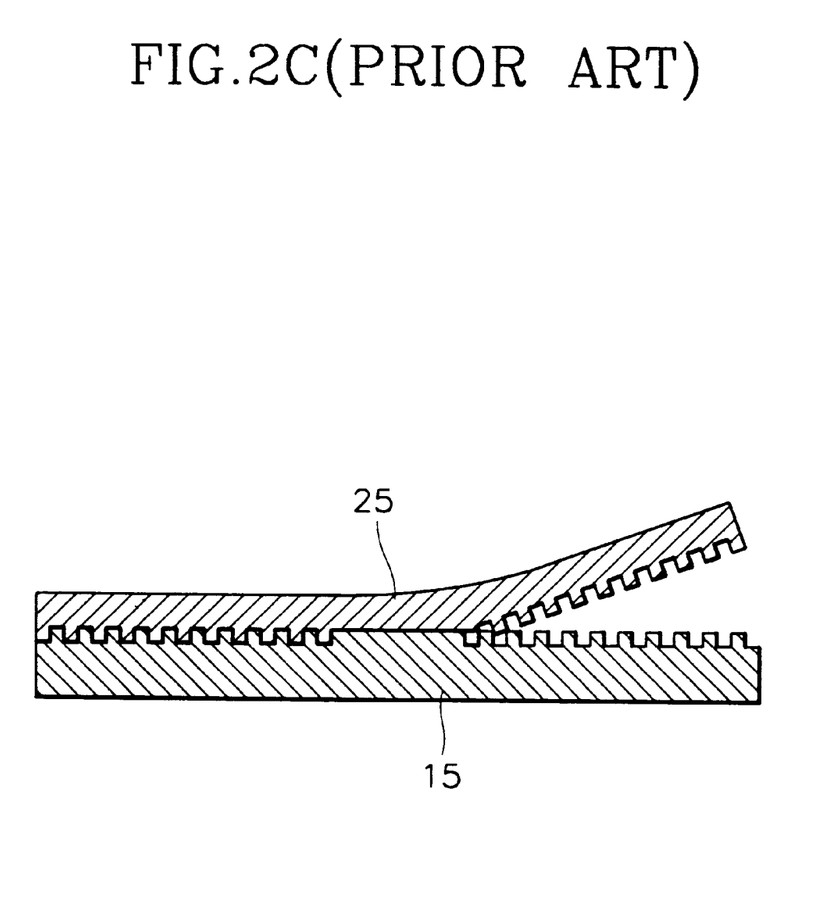
Figure 2D:
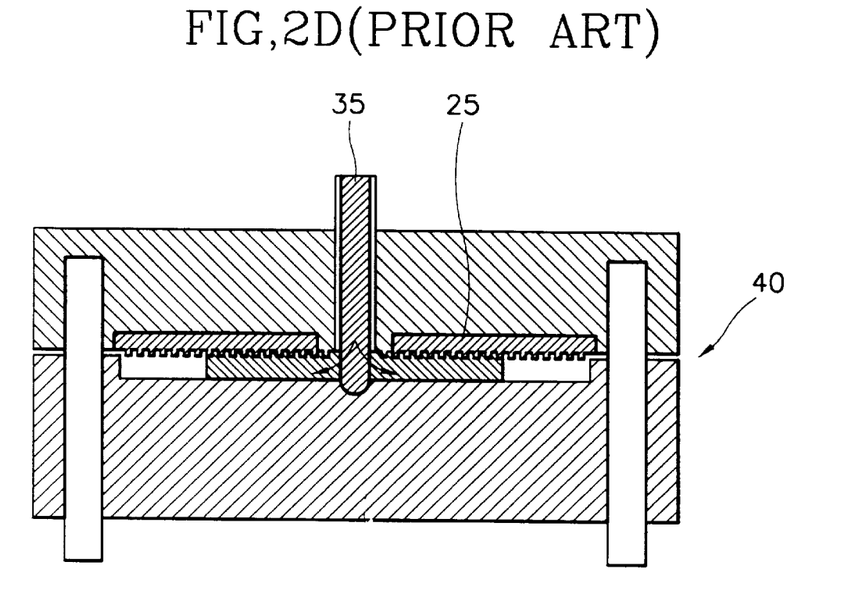

The master disk 15 is stamped to manufacture a father stamper 25 as shown in FIG. 2C, and then an optical disk is copied by an injection molding method in which resin 35 is injected into a mold 40 having the father stamper 25 mounted thereon, as shown in FIG. 2D.

In the above method, since the patterns of the lands, the grooves and the pits are formed on one photoresist layer through exposure and then simultaneously etched, boundaries between the land, the groove and the pit are not sharp. Accordingly, start and end points of information signals are not detected with accuracy during the reproduction of the information of the optical disk, thereby increasing jitter errors in which an output signal is not generated on time.

SUMMARY OF THE INVENTION

To solve the above problems, it is an object of the present invention to provide a method for manufacturing a master disk used for forming an optical disk by which a great deal of information can be recorded at a high density and a jitter error is reduced.

Additional objects and advantages of the invention will be set forth in part in the description which follows and, in part, will be obvious from the description, or may be learned by practice of the invention.

To achieve the above and other objects, a master disk manufacturing method of the present invention includes the steps of coating a first photoresist layer on a substrate; exposing the first photoresist layer according to patterns of a groove formation recess and a land formation protrusion corresponding to a groove and a land, respectively; etching the first photoresist layer and the substrate, to form the groove formation recess and the land formation protrusion on the substrate; coating a second photoresist layer on the substrate, to thereby form a groove and a land; exposing the second photoresist layer according to patterns of a pit where predetermined information is recorded; and etching the second photoresist layer, to thereby form the pits in the groove and the land.

Here, the substrate is made of $SiO_2$.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENT

Reference will now made in detail to the present preferred embodiment of the present invention, examples of which are illustrated in the accompanying drawings, wherein like reference numerals refer to the like elements throughout. The embodiment is described below in order to explain the present invention by referring to the figures.

Figure 3:
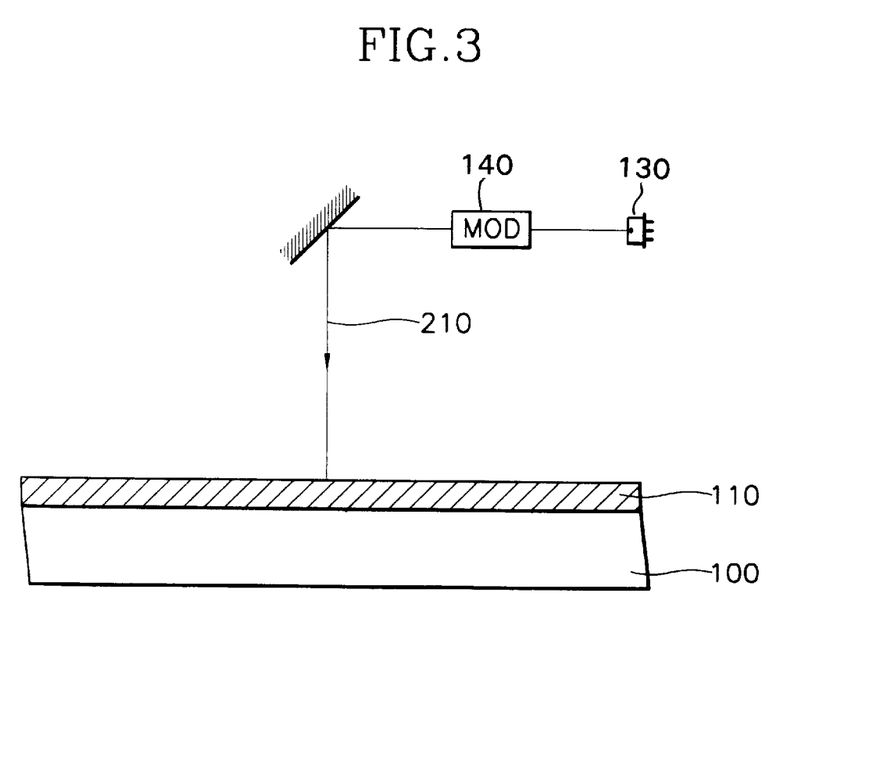
FIGS. 3 through 6 are views illustrating a manufacturing method of a master disk according to an embodiment of the present invention.

A master disk manufacturing method according to an embodiment of the present invention will be described with reference to FIGS. 3 through 6 and 7. As shown in FIGS. 3 and 7, in step 300, a first photoresist layer 110 is coated on a substrate 100. Here, the substrate 100 is made of $SiO_2$. Then, the first photoresist layer 110 is exposed to a laser beam 210 while rotating the substrate 100 (step 310). At this time, the first photoresist layer 110 is exposed in a pattern corresponding to a groove 101 (see FIG. 5) and a land 102, described later, by the laser beam 210 emitted by the laser 130 turned on/off by a modulator 140.

Figure 4:
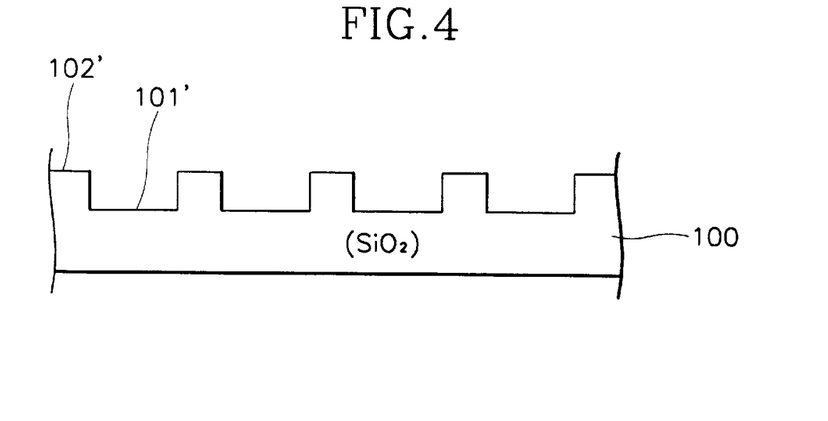

In step 320, as the exposed first photoresist layer 10 is etched along its exposed pattern, the substrate 100 is etched, through a reactive ion etching method. Then the remaining portion of the first photoresist layer 110 which is not etched is removed by washing. Accordingly, as shown in FIG. 4, a groove formation recess 101' and a land formation protrusion 102' corresponding to the groove 101 and the land 102, respectively, are formed on the $SiO_2$ substrate 100.

Figure 5:
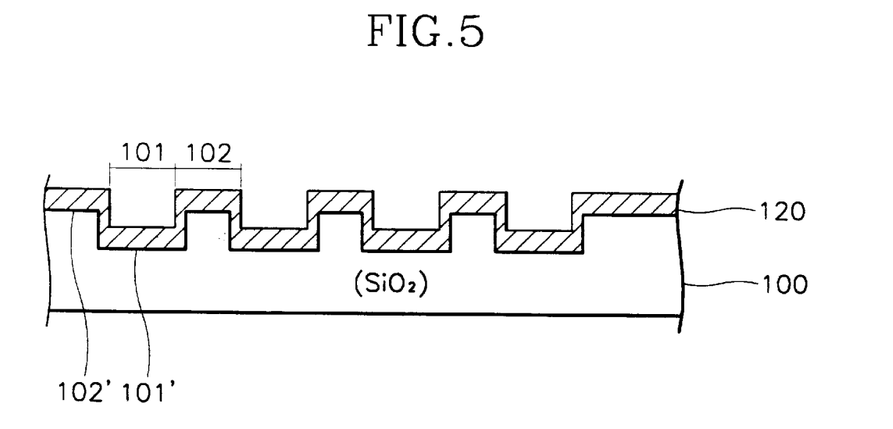

Next, a second photoresist layer 120 is coated on the $SiO_2$ substrate 100 as shown in FIG. 5 (step 330). At this time, the second photoresist layer 120 is coated along surfaces of the groove formation recess 101' and the land formation protrusion 102' with a uniform thickness. Accordingly, the formation of the groove 101 and the land 102 is completed by coating the second photoresist layer 120.

So as to form pits, the second photoresist layer 120 is exposed to the laser beam 210 in a pattern of the pit (step 340). The pit pattern is formed in the groove 101 and the land 102. For example, it is possible to allow the laser beam 210 to accurately trace the groove 101 and the land 102 by fine-controlling a laser reflection mirror such as a galvano mirror.

Figure 6:
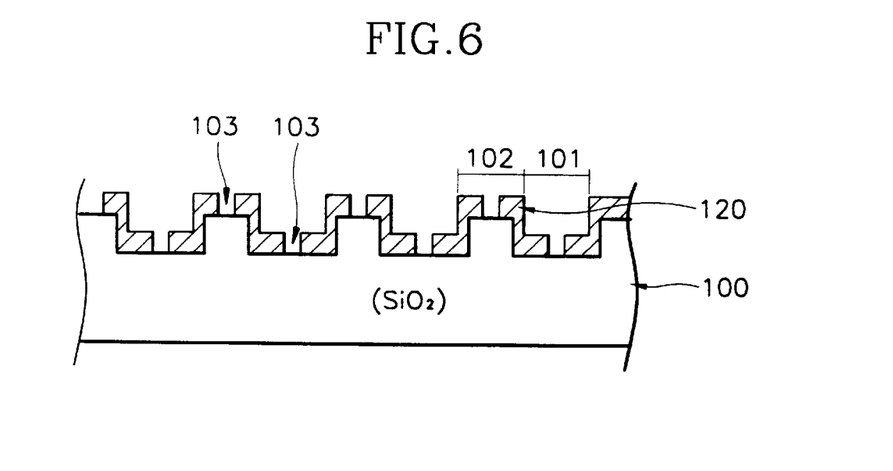
Figure 7:
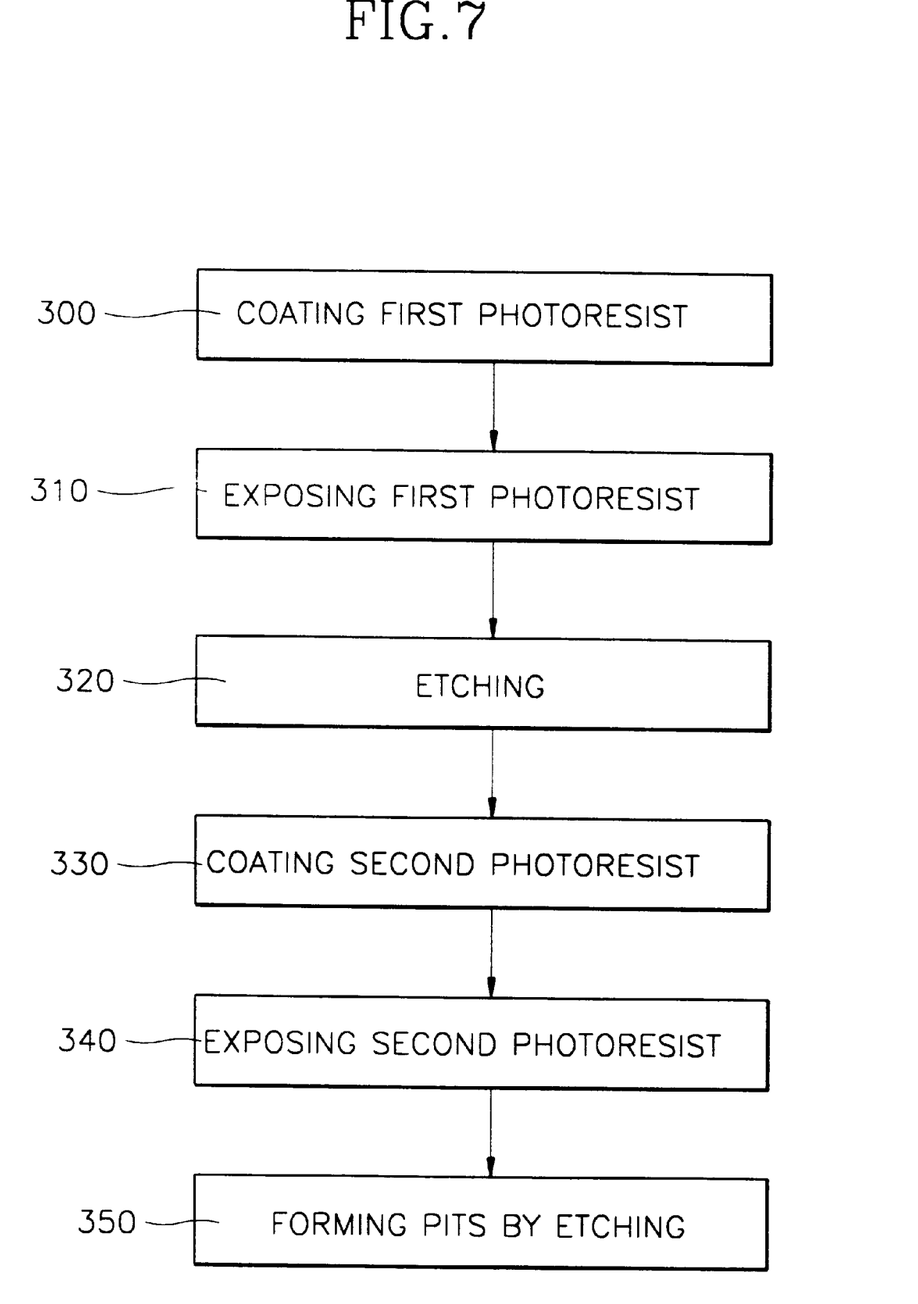
FIG. 7 is a flow chart for illustrating the manufacturing method of a master disk according to the embodiment of the present invention.

Subsequently, in step 350, the second photoresist layer 120 is etched according to a reactive ion etching method, to thereby form pits 103 on the groove 101 and the land 102 of the second photoresist layer 120 as shown in FIG. 6. Accordingly, the manufacture of the master disk is completed.

According to the present invention, the substrate 100 and the second photoresist layer 120 are separately etched, respectively, to thereby realize sharp boundaries between the groove, the land and the pit. An optical disk is stamped using the above master disk in the aforementioned manner.

The effect of the present invention will be more apparent through an example as follows.

EXAMPLE

Master disks (a) and (b) manufactured in a conventional art, have a capacity of 10 Gbyte and 15.12 Gbyte, respectively. Master disks (c) and (d) manufactured according to the present invention have grooves of $\lambda/6\eta$ deep, where '$\lambda$' indicates a wavelength of a reproducing laser and '$\eta$' indicates a refractive index of a disk, and pits of $\lambda/4n$ deep, where n=1, 2, 3, . . . . Also, a blue laser having a wavelength of 430 nm is used for the exposing laser 130. Groove angles and the jitter error ratios of the master disks (a) through (d) are shown in Table 1.

Here, the groove angle is an angle between a side of the groove and a horizontal plane of the disk.

TABLE 1

| Master disk | Capacity | Track pitch | Groove angle | Jitter error ratio |
|---|---|---|---|---|
| (a) | 10 GB | 0.6 μm | about 50° | 15% |
| (b) | 15. 12 GB | 0.4 μm | about 50° | 15~17% |
| (c) | 10 GB | 0.6 μm | about 80° | 4~6% |
| (d) | 15. 12 GB | 0.4 μm | about 80° | 6~8% |

As shown in Table 1, the groove angles of the master disks (a) and (b) are approximately 50°, whereas the groove angles of the master disks (c) and (d) are approximately 80°. That is, the grooves of the master disks (c) and (d) are formed to be sharper. Also, the jitter error ratio with respect to the master disk according to the present invention is reduced to a half of that of the conventional master disk.

According to the above manufacturing method of the present invention, the boundaries between the groove, the land and the pit are sharp and apparent, thereby improving characteristics of information recording and reproduction and realizing a high density recording of information.

What is claimed is:

1. A master disk, comprising:
    a substrate having a groove formation recess and a land formation protrusion; and
    a photoresist layer coated along surfaces of the groove formation recess and the land formation protrusion to form a groove and a land, wherein the photoresist layer has pits at locations extending to the groove formation recess and the land formation protrusion, to form the pits in the groove and the land.

2. The master disk as claimed in claim 1, wherein the groove is $\lambda/6\eta$ deep, where '$\lambda$' indicates a wavelength of a reproducing laser and '$\eta$' indicates a refractive index of an optical disk, and the pits are $\lambda/4n$ deep, where n is an integer.

3. The master disk as claimed in claim 1, wherein a groove angle of the groove is approximately 80°.

4. The master disk as claimed in claim 1, wherein a jitter ratio with respect to the master disk is between 4 and 8%.

5. A method of manufacturing a master disk, comprising the steps of:
    (a) coating a first photoresist layer on a substrate;
    (b) exposing the first photoresist layer according to patterns of a groove formation recess and a land formation protrusion corresponding to a groove and a land, respectively;
    (c) etching the first photoresist layer and the substrate, to form the groove formation recess and the land formation protrusion in the substrate;
    (d) coating a second photoresist layer on the substrate, to form the groove and the land at positions corresponding to the groove formation recess and the land formation protrusion, respectively;
    (e) exposing the second photoresist layer according to patterns of a pit where predetermined information is recorded; and
    (f) etching the second photoresist layer, to thereby form the pits in the groove and the land.

6. The method of claim 5, wherein the step (c) of etching the exposed substrate and the first photoresist layer and the step (f) of etching the second photoresist layer are performed according to a reactive ion etching method.

7. The method of claim 5, wherein the substrate is made of $SiO_2$.

8. The method of claim 5, wherein said step (c) further comprises totally removing the first photoresist layer subsequent to the etching of the first photoresist layer and the substrate and prior to said step (d).

9. A method of manufacturing a master disk, comprising the steps of:
    (a) forming a groove formation recess and a land formation protrusion corresponding to a groove and a land, respectively, in a substrate;
    (b) forming a first photoresist layer on the substrate having the groove formation recess and the land formation protrusion;
    (c) exposing the first photoresist layer according to patterns of a pit which record information; and
    (d) etching the first photoresist layer to form the pits in the groove and the land.

10. The method of claim 9, wherein said step (a) comprises the steps of:
    (a1) forming a second photoresist layer on the substrate;
    (a2) exposing the second photoresist layer in patterns of the groove formation recess and the land formation protrusion; and
    (a3) etching the second photoresist layer and the substrate to form the groove formation recess and the land formation protrusion.

11. The method of claim 10, wherein said step (a3) further comprises etching an exposed portion of the substrate subsequent to the etching of the second photoresist layer, and then totally removing the second photoresist layer.

12. The method of claim 9, wherein said step (b) comprises forming the first photoresist layer along surfaces of the groove formation recess and the land formation recess with a uniform thickness.

13. The method of claim 10, wherein said step (b) comprises forming the first photoresist layer along surfaces of the groove formation recess and the land formation protrusion with a uniform thickness.

14. The method of claim 9, wherein the substrate is made of $SiO_2$.

15. The method of claim 10, wherein the substrate is made of $SiO_2$.

16. The method of claim 9, wherein said step (c) comprises radiating a laser beam on the first photoresist layer to expose the first photoresist layer.

17. The method of claim 10, wherein said step (c) comprises radiating a laser beam on the first photoresist layer to expose the first photoresist layer.

18. The method of claim 10, wherein said step (c) comprises radiating a laser beam on the first photoresist layer to expose the first photoresist layer, and said step (a2) comprises radiating the laser beam on the second photoresist layer to expose the second photoresist layer.

19. The method as claimed in claim 9, wherein the groove is $\lambda/6\eta$ deep, where '$\lambda$' indicates a wavelength of a reproducing laser and '$\eta$' indicates a refractive index of an optical disk, and the pits are $\lambda/4n$ deep, where n is an integer.

20. The method as claimed in claim 10, wherein the groove is $\lambda/6\eta$ deep, where '$\lambda$' indicates a wavelength of a reproducing laser and '$\eta$' indicates a refractive index of an optical disk, and the pits are $\lambda/4n$ deep, where n is an integer.

* * * * *

UNITED STATES PATENT AND TRADEMARK OFFICE
CERTIFICATE OF CORRECTION

PATENT NO. : 6,071,586
DATED : June 6, 2000
INVENTOR(S) : Myong-do Ro et al.

It is certified that error appears in the above-identified patent and that said Letters Patent is hereby corrected as shown below:

<u>Title page,</u>
Section [56], Foreign Patent Documents, insert the following:
    8-241541    9/17/1996    Japan Signed and Sealed this Ninth Day of October, 2001

*Attest:*

NICHOLAS P. GODICI
*Attesting Officer    Acting Director of the United States Patent and Trademark Office*